(12) United States Patent
Zhou et al.

(10) Patent No.: US 7,884,820 B2
(45) Date of Patent: Feb. 8, 2011

(54) INTERACTIVE RELIGHTING WITH DYNAMIC REFLECTANCE

(75) Inventors: Kun Zhou, Beijing (CN); Yanyun Chen, Haidian District (CN); Stephen S. Lin, Haidian District (CN); Baining Guo, Beijing (CN)

(73) Assignee: Micorsoft Corporation, Redmond, WA (US)

( * ) Notice: Subject to any disclaimer, the term of this patent is extended or adjusted under 35 U.S.C. 154(b) by 880 days.

(21) Appl. No.: 11/764,062

(22) Filed: Jun. 15, 2007

(65) Prior Publication Data

US 2008/0309667 A1 Dec. 18, 2008

(51) Int. Cl.
*G06T 15/00* (2006.01)
(52) U.S. Cl. .................... 345/426; 345/419; 345/619; 345/629
(58) Field of Classification Search ............. 345/419, 345/426, 619, 629
See application file for complete search history.

(56) References Cited

U.S. PATENT DOCUMENTS

2003/0179197 A1 9/2003 Sloan et al.
2006/0132486 A1 6/2006 Kim et al.

OTHER PUBLICATIONS

Akenine-Moller et al, Sparse Lumigraph Relighting by Illumination and Reflectance Estimation from Multi-View Images, Eurographics Symposium on Rendering, Jun. 26, 2006, pp. 1-10.*
Matusik et al., A Data-Driven Reflectance Model, ACM Trans. Graph. 22, 3(2003), pp. 759-769.*
Liu, Xinguo et al., "All-Frequency Precomputed Radiance Transfer for Glossy Objects", Eurographics Symp. Rendering, 2004, pp. 337-344.
Matusik, Wojciech, et al., "A Data-Driven Reflectance Model", SIGGRAPH, 2003, pp. 759-769.
Ng, Ren et al., "Tripe Product Wavelet Intergrals for All-Frequency Relighting", ACM Trans. Graph. 23, 3, 2003, pp. 477-487.
Wen, et al., "Face Relighting with Radiance Environment Maps", IEEE Conference on Computer Vision and Pattern Recognition, vol. 2, Jun. 30, 2003, pp. 158-165 (p. 159, right col. , line 04-p. 162, left col., line 16; figures 4, 8.

* cited by examiner

*Primary Examiner*—Phu Nguyen
(74) *Attorney, Agent, or Firm*—Lee & Hayes, PLLC

(57) ABSTRACT

Interactive relighting with dynamic reflectance involves relighting a graphical scene with dynamic changes to the reflectance(s) in the graphical scene. A graphical scene may include source radiance, regions having reflectances, a surface spot, incident radiation from the source radiance at the surface sport, an incident direction, a viewing direction, exit radiance, and so forth. In an example embodiment, a graphical scene is relighted based on at least one adjusted reflectance of the graphical scene using an incident radiance at a surface spot that is separated into respective incident radiance components corresponding to different respective numbers of interreflections in the graphical scene. In another example embodiment, a graphical scene is relighted based on at least one adjusted reflectance of the graphical scene using a tensor representation for a reflectance of a surface spot with the tensor representation being segmented into three adjustable factors for lighting, viewing, and reflectance.

13 Claims, 12 Drawing Sheets

US 7,884,820 B2

INTERACTIVE RELIGHTING WITH DYNAMIC REFLECTANCE

BACKGROUND

When computers first started displaying graphics, the visual graphics were rudimentary. They tended to be limited to lines and then combinations of lines and blocks. Over time, the capability of computers to display graphics has increased significantly. Computers can now display three-dimensional (3D) graphics with realistic-looking surfaces.

In fact, computer-generated graphics are becoming more and more realistic. One approach to generating realistic-looking graphics involves accurately mimicking the behavior of light as it propagates through a graphical scene, including with respect to surfaces. The result can be impressive compared to the rudimentary lines and blocks of the past. Unfortunately, accurately mimicking light propagation behavior within a graphical scene is computationally intensive. Consequently, there are formidable barriers to displaying real-world lighting effects in real-time.

SUMMARY

Interactive relighting with dynamic reflectance involves relighting a graphical scene with dynamic changes to the reflectance(s) in the graphical scene. A graphical scene may include source radiance, regions having reflectances, a surface spot, incident radiation from the source radiance at the surface sport, an incident direction, a viewing direction, exit radiance, and so forth. In an example embodiment, a graphical scene is relighted based on at least one adjusted reflectance of the graphical scene using an incident radiance at a surface spot that is separated into respective incident radiance components corresponding to different respective numbers of interreflections in the graphical scene. In another example embodiment, a graphical scene is relighted based on at least one adjusted reflectance of the graphical scene using a tensor representation for a reflectance of a surface spot with the tensor representation being segmented into three adjustable factors for lighting, viewing, and reflectance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
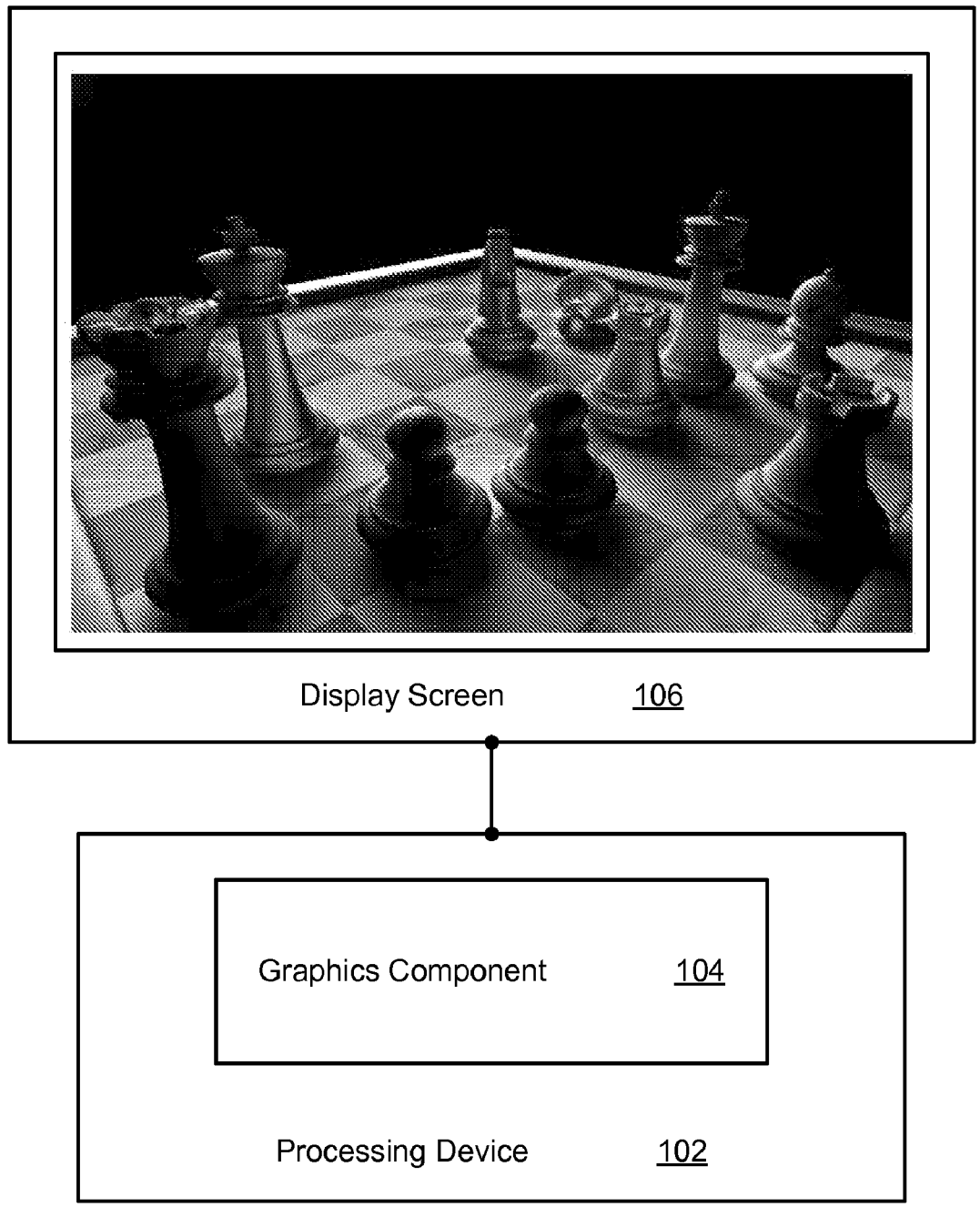
FIG. 1 is a block diagram of an example processing device having a graphics component that may be used to implement interactive relighting with dynamic reflectance.

Introduction to Interactive Relighting With Dynamic Reflectance

Generally, embodiments for interactive relighting are described in which source radiance, viewing direction, and bidirectional reflectance distribution functions (BRDFs) can each be changed on the fly. In handling dynamic BRDFs, described techniques efficiently account for the effects of BRDF modification on the reflectance and incident radiance at a surface point. For reflectance, we describe a BRDF tensor representation that can be factorized into adjustable terms for lighting, viewing, and BRDF parameters. For incident radiance, there exists a non-linear relationship between global illumination and BRDFs in a scene. To address this nonlinearity, we describe precomputed transfer tensors (PTTs) that decompose or separate global illumination into precomputable components that are each a function of BRDFs in the scene. These components can be relatively rapidly combined at run time to accurately determine incident radiance. We additionally describe a technique for efficient handling of high-frequency mirror reflections by extracting them from the BRDF tensor representation and processing them using precomputed visibility information.

With computer graphics, the visual quality of a computer-generated scene can be appreciably enhanced by simulating the natural propagation of light. Before reaching the viewer, light emitted from illumination sources may undergo a number of physical interactions in a scene, giving rise to rich visual effects such as soft shadows and interreflections. Accounting for the myriad paths of light through a scene and their complex interactions with objects, however, involves a substantial expense in computation. For interactive/real-time relighting, much of this global illumination computation may be performed in advance.

Although arbitrary environment lighting is possible at run time, the exit radiance at a surface point may be efficiently evaluated using precomputed radiance transfers (PRT) in a conventional approach. Different transfer functions are precomputed for different levels of reflectance effects. For view-independent diffuse reflections, source lighting is transformed by a transfer vector into exit radiance from a surface point. For view-dependent glossy reflections, a transfer matrix is used to convert source illumination into a distribution of exit radiance that can be evaluated in the direction of the viewer. These radiance transfer functions are precomputed with respect to given BRDFs in the scene. As a result, these reflectance material properties are effectively baked into the transfer mechanism and cannot be changed at run time for this existing PRT approach.

In contrast, we describe an example interactive relighting technique that more generally accommodates changes in reflectance in addition to lighting conditions and viewing directions. The consideration of dynamic BRDFs in global illumination brings special challenges. BRDF models can be evaluated with respect to changing incident light distributions, viewing directions, and reflectance parameters. To facilitate this, we describe example embodiments involving a reflectance tensor representation that can be factorized or segmented into adjustable components for each of these dynamic quantities.

As noted above, another challenging issue is that incoming radiance at a surface point has a non-linear relationship to BRDFs in a scene. This nonlinearity arises partly from the multiple times a light ray may interact with a surface or surfaces during global illumination, such that the ray becomes transformed by the surfaces' BRDFs multiple times. Because of this non-linearity, dynamic BRDFs cannot be incorporated into PRT or other linear precomputed light transport frameworks in the same manner as dynamic source lighting.

In contrast, we describe an example approach that decomposes or separates the incoming radiance at a surface point into components that can be precomputed as a function of source radiance and reflectances in the scene. In an example embodiment, these components specifically represent global illumination along different light paths that arrive at a given surface point. Precomputed transfer tensors (PTT) can relate these incident radiance components along each path to source illumination and scene reflectances. By precomputing PTTs and then evaluating and combining these components at run time, example embodiments can efficiently determine the non-linear changes in global illumination that result from modifications of reflectance parameters. With this PTT-based formulation, scenes can be interactively rendered with dynamic lighting conditions, viewing directions, and reflectances.

Aside from the challenges of computing the appearance effects of dynamic BRDFs, the factorization of BRDFs used to facilitate precomputation involves an issue. For BRDFs with sharp specular components, numerous basis terms are used for accurate reconstruction, at a considerable expense in performance. To avoid the inefficiencies associated with large bases, an example embodiment extracts the mirror parts of specular reflections from the BRDF tensor representation and processes them independently using an efficient procedure based on precomputed visibility information. This high-frequency lighting is then combined with the PTT results to yield a final rendering.

Thus, in an example embodiment, the PTT technique facilitates interactive relighting generalized to also include dynamic BRDFs. With PTTs, a factorized tensor representation of BRDFs, and/or separate processing of mirror reflections, compelling transformations in the appearance of objects can be generated. Moreover, the resulting global illumination effects in the surrounding scene can also be realistically produced. Certain described embodiments for interactive relighting with dynamic reflectance have a variety of example applications. One application is for real-time rendering of scenes containing objects whose BRDFs are animated (such the morphing of a human into a liquid metal robot). Another application is the interactive tuning of material properties under global illumination. Interactive relighting with dynamic reflectance can also be used in other applications.

Example Embodiments for Interactive Religting With Dynamic Reflectance

1: Introduction—Example Environments and Overview

FIG. 1 is a block diagram 100 of an example processing device 102 having a graphics component 104 that may be used to implement interactive relighting with dynamic reflectance. As illustrated, processing device 102 includes a graphics component 104 and is coupled to a display screen 106. Display screen 106 may be separate from or integrated with processing device 102.

Processing device 102 may be realized as, by way of example but not limitation, a general personal computer (e.g., a notebook, desktop, portable, etc. computer); a client, server, or workstation computer; a television-based device; an entertainment appliance (including portable ones); a mobile phone; a gaming device; a personal digital assistant (PDA); a device otherwise described herein; some combination thereof; and so forth. An example embodiment for a processing device 102 is described herein below with particular reference to FIG. 12.

In example embodiment(s), graphics component 104 is capable of realizing one or more implementations of interactive relighting with dynamic reflectance. An example embodiment for a graphics component 104 is described herein below with particular reference to FIG. 4. The visual results of interactive relighting with dynamic reflectance may be presented on display screen 106.

By way of example only, a visual result is shown in block diagram 100 at display screen 106. A graphical scene of a 3D chess board with multiple pieces is displayed. Interreflections of light are rendered in the illustrated chess scene. In fact, the example chess scene is relighted while including light that has previously bounced off of zero, one, or two prior regions, such as the board or chess pieces. Light interreflections and numbers of bounces are described further herein below.

Figure 2:
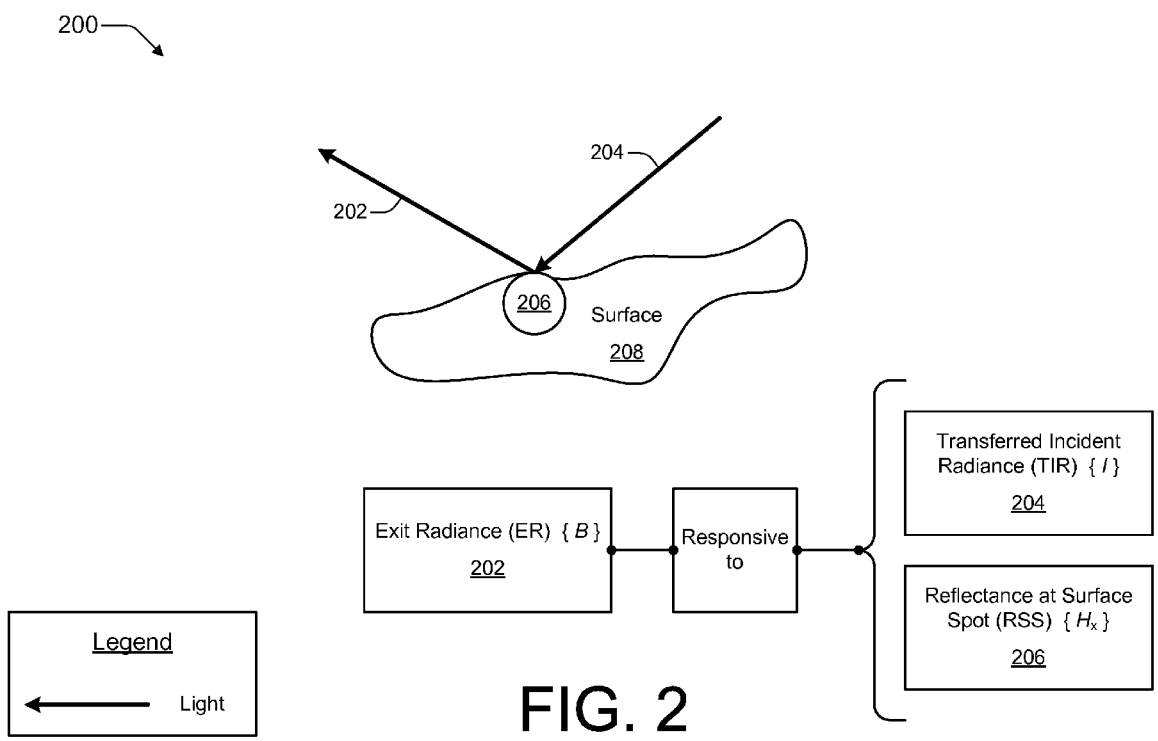
FIG. 2 is a block diagram of an example surface producing an exit radiance (ER) from a transferred incident radiance (TIR) and a reflectance at a surface spot (RSS).

FIG. 2 is a block diagram 200 of an example surface 208 producing an exit radiance (ER) 202 from a transferred incident radiance (TIR) 204 and a reflectance at a surface spot (RSS) 206. As illustrated, the legend indicates that the arrows represent light (e.g., light rays). Transferred incident radiance 204 impacts surface 208 at a surface spot having a reflectance 206 that results in exit radiance 202.

In an example embodiment, exit radiance 202 is produced responsive to transferred incident radiance 204 and reflectance at surface spot 206. An example quantitative implementation for this relationship is given below by equation (1). In equation (1), exit radiance 202 is represented by B, transferred incident radiance 204 is represented by I, and reflectance at surface spot 206 is represented by H.

2: Example General Embodiments

Figure 3:
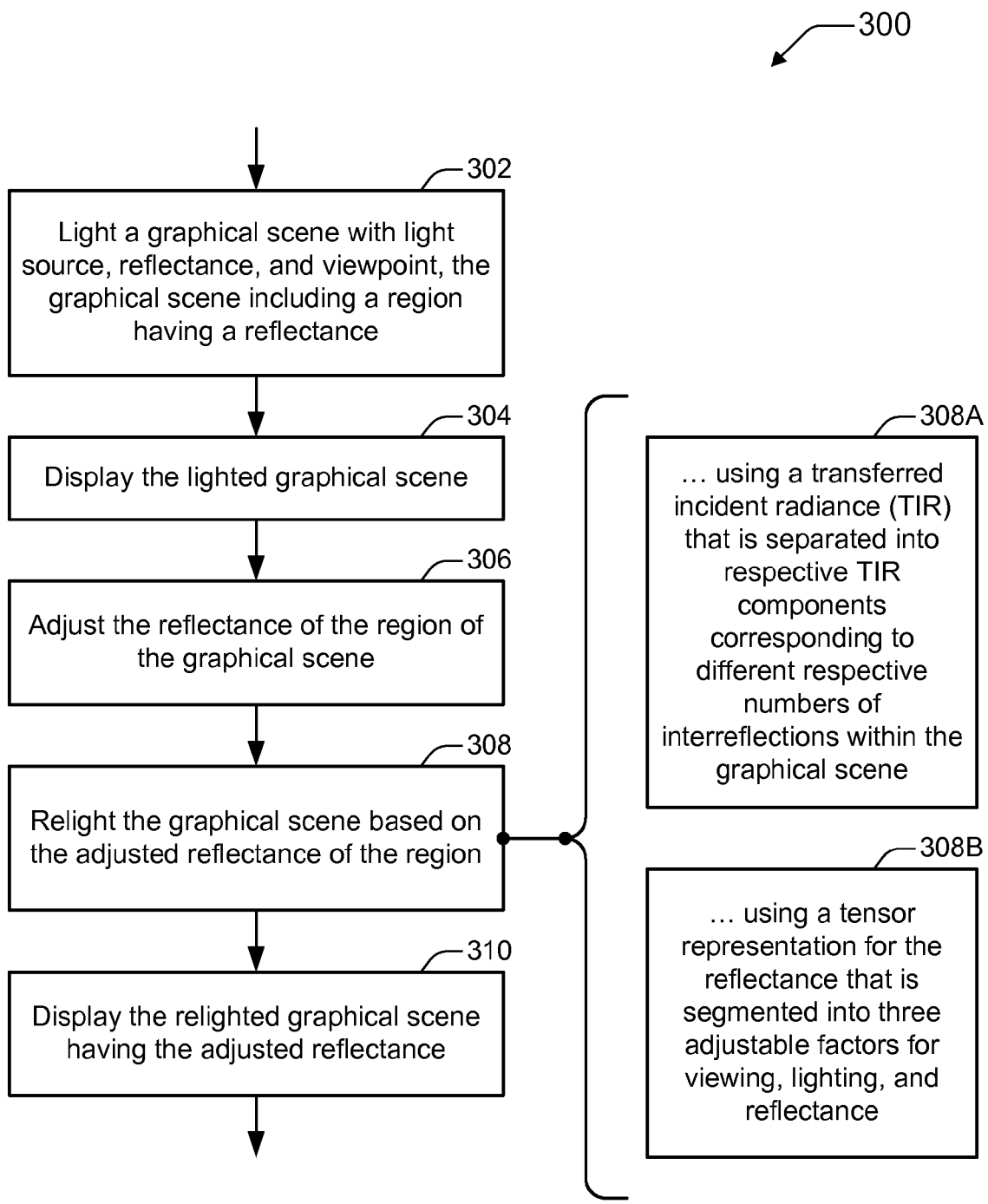
FIG. 3 is a flow diagram that illustrates an example of a method for interactive relighting with dynamic reflectance.

FIG. 3 is a flow diagram 300 that illustrates an example of a method for interactive relighting with dynamic reflectance. Flow diagram 300 includes five (5) blocks 302-310, with block 308 also including blocks 308A and 308B. Implementations of flow diagram 300 may be realized, for example, as processor-executable instructions and/or a graphics component 104 (of FIGS. 1 and 4). The acts of this flow diagram may be performed in many different environments and with a variety of devices, such as by a processing device 102 (of FIG. 1). More detailed example embodiments for implementing flow diagram 300 are also described further below in reference to other FIGS. in Section 3 (and Section 4). The order in which the method is described is not intended to be construed as a limitation, and any number of the described blocks can be combined, augmented, rearranged, and/or omitted to implement a respective method, or an alternative method that is equivalent thereto.

In an example embodiment, at action 302, a graphical scene, which includes a region having a reflectance, is lighted with a light source, a reflectance, and a viewpoint. For example, a graphics component 104 may light a graphical scene. Examples of light sources, reflectances, viewpoints, regions, etc. are described further herein below with particular reference to FIG. 5.

At action 304, the lighted graphical scene is displayed. For example, the lighted graphical scene may be displayed on a display screen 106. At action 306, the reflectance of the region of the graphical scene is adjusted. For example, the reflectance of a visible or a hidden region may be adjusted.

At action 308, the graphical scene is relighted based on the adjusted reflectance of the region. For example, the adjusted reflectance, whether visible or hidden, may affect the incident light at a given surface spot. Thus, when a reflectance is adjusted, the appearance of the graphical scene may be updated by relighting the scene. The adjusted reflectance may correspond to a region generally or to the surface spot specifically.

The act(s) of block 308 may be implemented in many different manners in accordance with described embodiments. Blocks 308A and 308B illustrate two different example embodiments. These two example embodiments may be implemented individually, jointly, simultaneously, sequentially, partially or fully overlapping, and so forth.

At block 308A, the graphical scene is relighted based on the adjusted reflectance of the region using an incident radiance that is separated into respective incident radiance components corresponding to different respective numbers of interreflections within the graphical scene. Example implementations of this embodiment are described further herein below with particular reference to FIGS. 6-8.

At block 308B, the graphical scene is relighted based on the adjusted reflectance of the region using a tensor representation for the reflectance that is segmented into three adjustable factors for viewing, lighting, and reflectance. Example implementations of this embodiment are described further herein below with particular reference to FIG. 9.

At action 310, the relighted graphical scene having the adjusted reflectance is displayed. For example, the relighted graphical scene may be displayed on a display screen 106. Changes to the graphical scene resulting from the reflectance adjustment and subsequent relighting may be readily apparent to the human eye.

Figure 4:
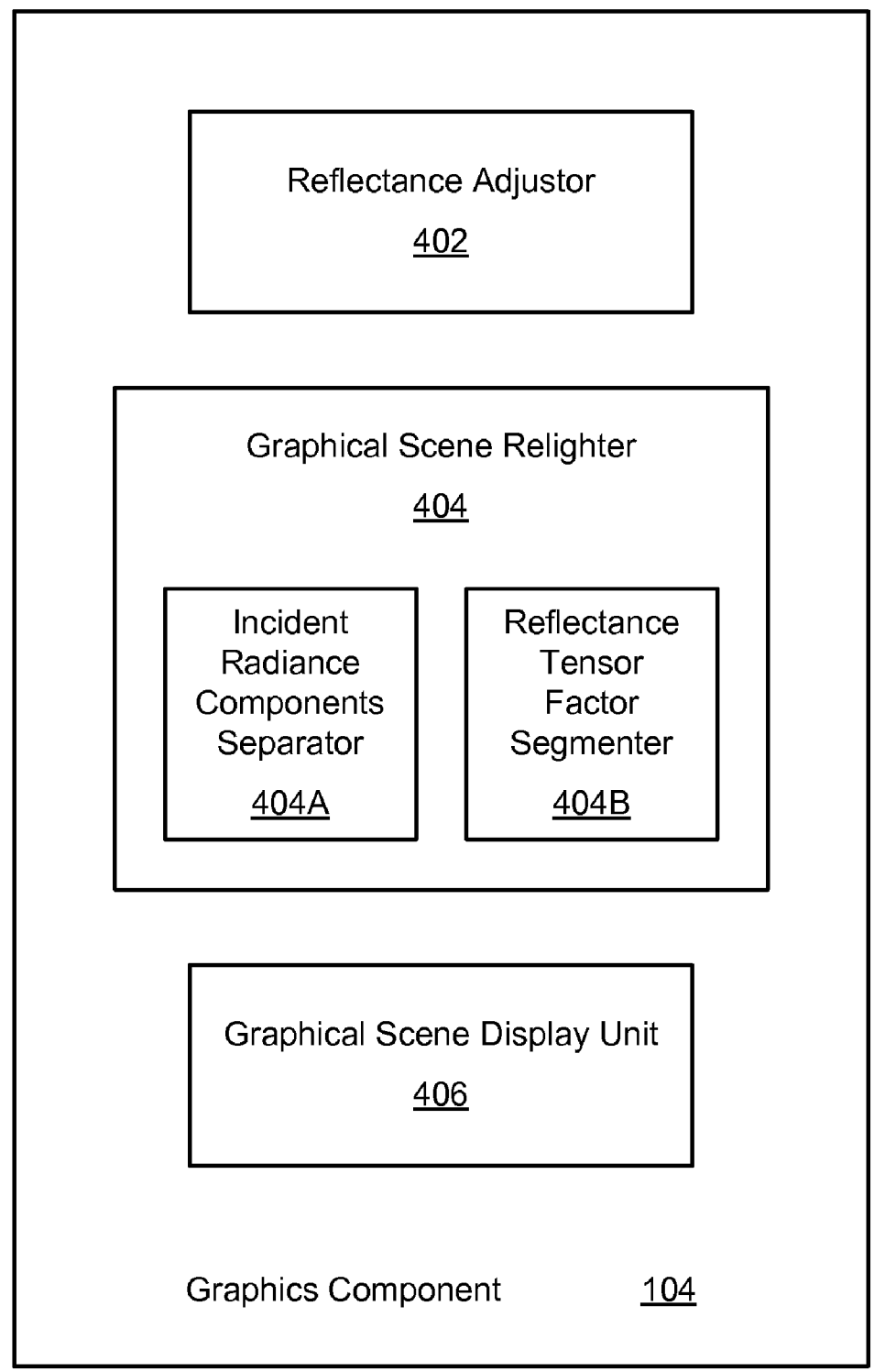
FIG. 4 is a block diagram of an example graphics component that may be used to implement interactive relighting with dynamic reflectance.

FIG. 4 is a block diagram of an example graphics component 104 that may be used to implement interactive relighting with dynamic reflectance. As illustrated, graphics component 104 includes a reflectance adjustor 402, a graphical scene relighter 404, and a graphical scene display unit 406. Graphical scene relighter 404 includes an incident radiance components separator 404A and a reflectance tensor factor segmenter 404B. Graphics component 104 may be realized, for example, as software, firmware, hardware (e.g., a GPU, CPU, controller, etc.), fixed logic circuitry, some combination thereof, and so forth.

In an example embodiment, reflectance adjustor 402 may perform act(s) of adjusting at least one reflectance of one or more regions of a graphical scene. Graphical scene display unit 406 may perform act(s) of displaying on a display screen each graphical scene as it is relighted based on adjustments to reflectance, source radiance, viewpoint, and so forth.

Graphical scene relighter 404 relights a graphical scene based on adjustment(s) to one or more of source radiance, viewing direction, reflectance, and so forth. Incident radiance components separator 404A separates the incident radiance into respective components corresponding to respective numbers of interreflections within the graphical scene. The components may comprise PTTs, with each being a function of the reflectances of the scene.

Reflectance tensor factor segmenter 404B segments a tensor that represents reflectance at a surface spot into multiple factors. These factors may be adjustable and may be associated with viewing, lighting, reflectance, etc. parameters. Example embodiments of these various components and acts are described in greater detail herein below.

3: Example Specific Embodiments

Figure 5:
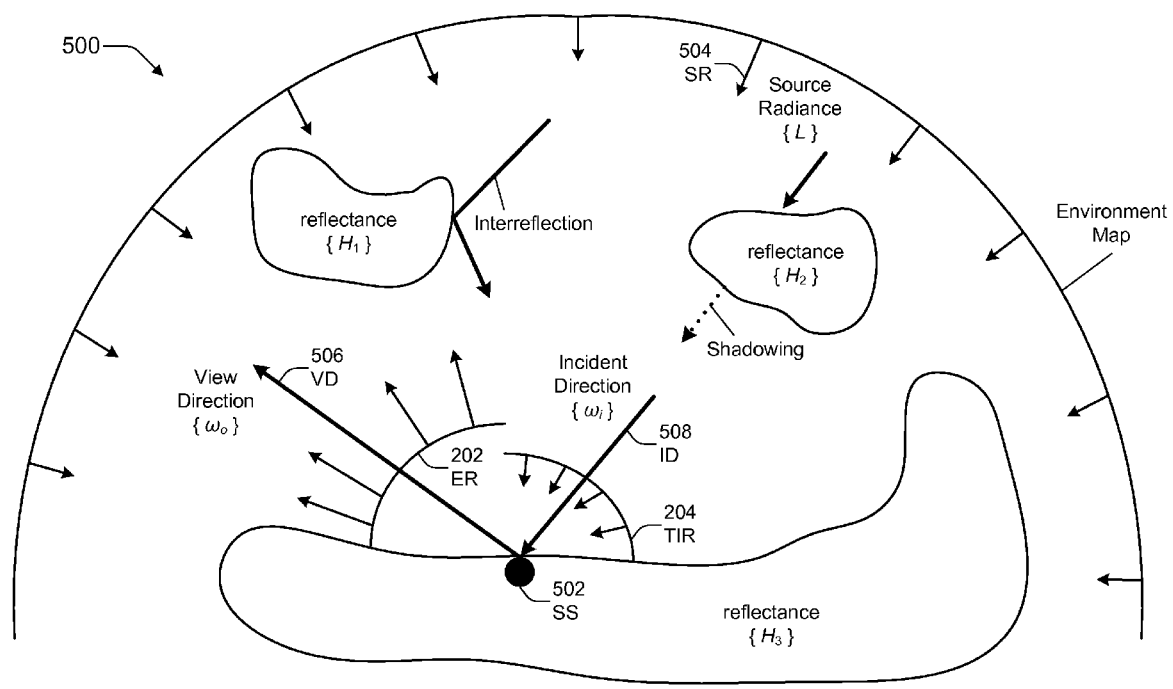
FIG. 5 is a diagram of an example scene illustrating a relighting with source radiance, transferred incident radiance, reflectances, incident direction, and view direction with respect to a surface spot.

FIG. 5 is a diagram of an example scene 500 illustrating a relighting with source radiance 504, transferred incident radiance 204, reflectances, incident direction 508, and view direction 506 with respect to a surface spot 502. Scene 500 thus illustrates an example scenario for relighting under global illumination. Scene 500 is illuminated by a distant source radiance (SR) 504 that is described by an environment map. Three regions having a reflectance are included as part of scene 500. These are represented by reflectances $H_1$, $H_2$, and $H_3$. As used herein, reflectance is a general term. However, without loss of generality, BRDFs are referred to herein in some descriptive portions as an example of reflectance.

Source radiance 504 propagates through the scene, undergoing global illumination effects such as interreflection (at reflectance region $H_1$) and shadowing (at reflectance region $H_2$). Given a fixed spatial configuration of the scene, this global illumination is influenced by the BRDFs of the objects within. However, it should be understood that the principles of the described embodiments are not limited to relighting with a fixed spatial configuration.

Surface spot (SS) 502 is a point, area, etc. on a surface. At a given surface spot 502, the incoming global illumination, referred to as transferred incident radiance 204, is transformed into exit radiance 202 according to the BRDF of the spot. Evaluating exit radiance 202 in viewing direction (VD) 506 yields the appearance of the point in the rendered image. As used herein, incident radiance is a general term. However, without loss of generality, the more specific transferred incident radiance terminology is used herein in some descriptive portions.

With relighting, the scene is to be rendered with changes in source radiance L and viewing angle $\omega_o$, or more generally, also with changes in scene reflectances H. By way of example but not limitation, reflectances H are represented as a $n_R \times n_P$ matrix where $n_R$ is the number of distinct scene regions with dynamic BRDFs and $n_P$ is the size of a basis used to represent reflectance parameters. From a rendering equation, the exit radiance B of a scene point x can be formulated as the following relighting equation (1):

$$B_x(L, H, \omega_o) = \int_\Omega I_x(L, H, \omega_i) f(H_x, \omega_o, \omega_i)(\omega_i \cdot n_x) d\omega_i. \quad (1)$$

This relighting equation (1) is comprised of two major components. One component is the incident radiance $I_x(L, H, \omega_i)$ arriving at x, which is dependent on the BRDFs in the scene as well as the source radiance L and the incident direction $\omega_i$. The other component $f(H_x, \omega_o, \omega_i)$ is the reflectance function, which relates transferred incident radiance from direction $\omega_i$ to exit radiance with respect to the reflectance $H_x$ of the surface spot. In the following, we describe example formulations for incident radiance and reflectance functions, and then describe an example procedure for interactive relighting using these two components.

3.1: Incident Radiance (E.g., Transferred Incident Radiance (TIR))

To handle global illumination in a manner that facilitates efficient run-time evaluation of incident radiance, we describe a scheme that divides or separates incident radiance into components that can be precomputed as a function of the BRDFs in the scene. In an example embodiment, each component represents incident radiance with respect to a sequence of BRDF basis functions for surfaces along a light path from the environment map. Thus, for light that reflects first from a region $R_1$ and then from a region $R_2$ before reaching the surface spot, there is a component for each pair of BRDF basis functions from the two regions. We precompute PTTs with respect to the different sequences of BRDF basis functions. At run time, these transferred incident radiance components are evaluated and combined according to current values of reflectance H and source radiance L.

In an example embodiment, for processing sequences of BRDF basis functions, we group light paths by the number of interreflections they include, such that the incident radiance may be expressed as follows in equation (2):

$$I_x = I_x^0 + I_x^1 + I_x^2 + \ldots, \quad (2)$$

where $I_x^k$ is the total transferred incident radiance of light paths with k interreflections.

In most scenes, there exist innumerable paths of global illumination. However, because of surface absorption, the magnitude of global illumination tends to decrease rapidly for larger values of k. Consequently, for an example embodiment, we consider transferred incident radiance for $k \leq 2$. In addition, the frequency characteristics of global illumination become considerably lower after each interreflection due to scattering of light, so for further computational efficiency an example implementation involves modeling the transferred incident radiance: of direct lighting $I_x^0$ in terms of wavelets, of $I_x^1$ by fourth-order spherical harmonics, and of $I_x^2$ as a scalar.

Figure 6:
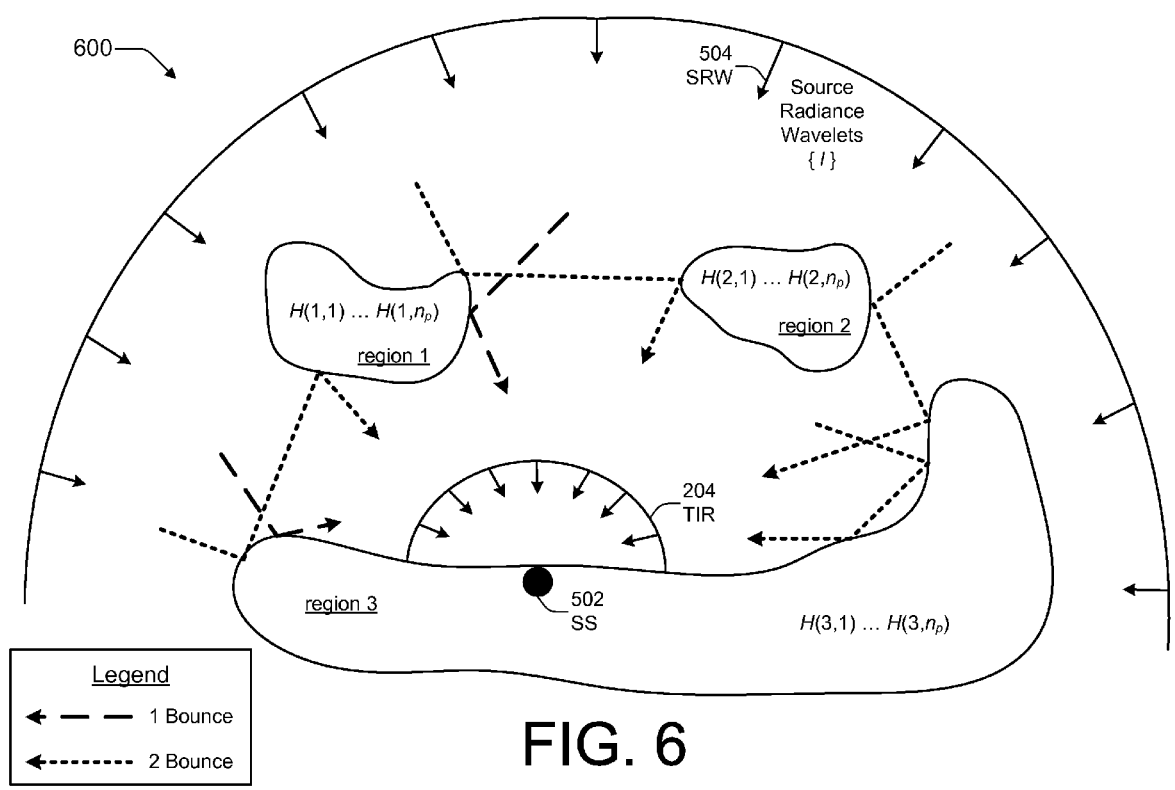
FIG. 6 is a diagram of a scene illustrating an example transferred incident radiance that is separated into two different components corresponding to one and two interreflections in the scene.

FIG. 6 is a diagram of a scene 600 illustrating an example incident radiance that is separated into two different components corresponding to one and two interreflections in the scene. As illustrated, scene 600 includes three regions 1, 2, and 3. Source radiance 504 is shown as source radiance wavelets (SRW) 504 and represented by the variable "l". As indicated by the legend, one-bounce incidence radiance is represented by arrows with long dashes, and two-bounce incidence radiance is represented by arrows with short dashes.

Scene 600 illustrates paths of global illumination with sequences of BRDF basis functions, as modeled by PTTs. As shown, $I_x^1$ includes $n_R$ separate light paths with $n_P$ different basis functions for each path. For an example embodiment, to expedite computation of $I_x^1$ at run time, we precompute a PTT $T_x^1$ that relates source radiance to transferred incident radiance with respect to each of these sequences of BRDF basis functions.

Specifically, for one-bounce interreflection, we have a 4D tensor $T_x^1$ (l, r, p, s) in terms of source radiance wavelet l, region r, BRDF basis function p, and spherical harmonic s of the transferred incident radiance. For two-bounce interreflection, we similarly consider light paths that involve $n_R \times n_R$ ordered pairs of regions with $n_P \times n_P$ possible basis function pairs for each path. Because $I_x^2$ is a scalar, we precompute a 5D PTT $T_x^2$ (l, $r_1$, $p_1$, $r_2$, $p_2$), where the subscripts index the first and second interreflections.

Figure 7:
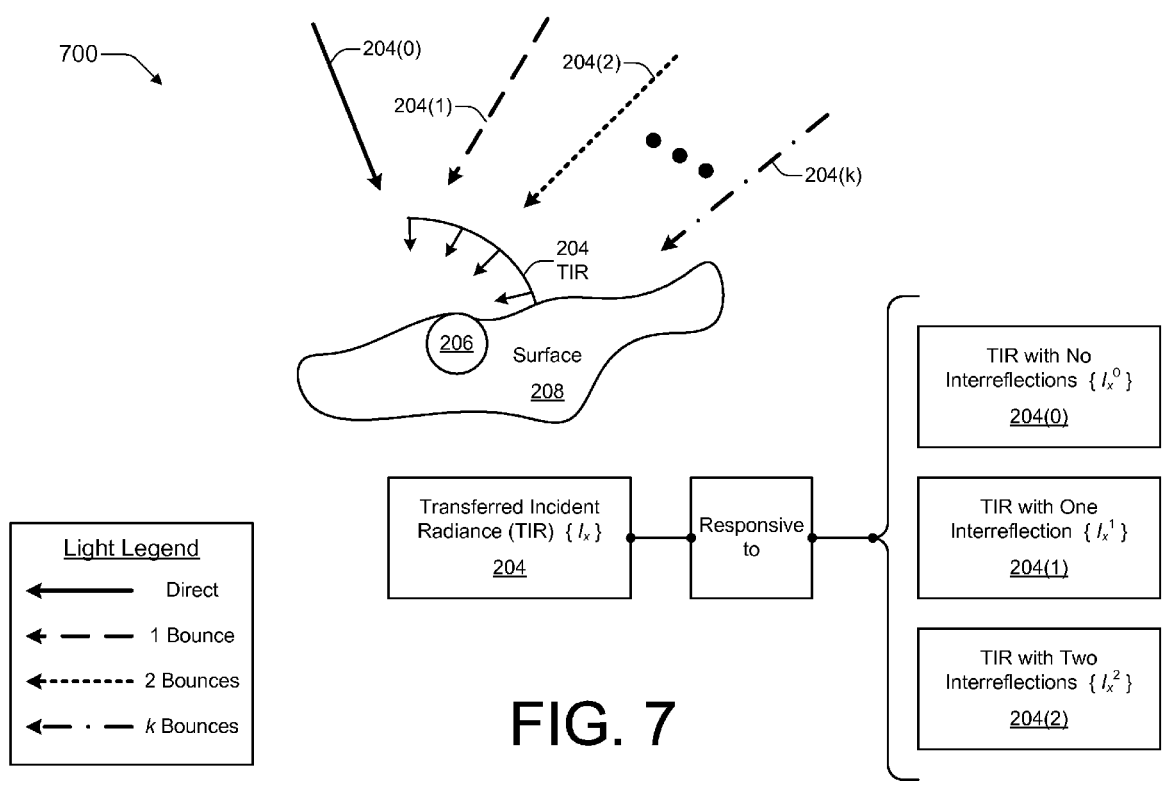
FIG. 7 is a block diagram of an example transferred incident radiance separation into respective transferred incident radiance components that correspond to different respective numbers of interreflections in a scene.

FIG. 7 is a block diagram 700 of an example transferred incident radiance separation into respective transferred incident radiance components that correspond to different respective numbers of interreflections in a scene. As illustrated, a surface 208 includes a reflectance at surface spot 206. An incident radiance 204 is separated into multiple incident radiance components 204(0) ... 204(k), with "k" being some integer. As indicated by the light legend, direct radiance 204(0) is represented by a solid line, one-bounce radiance 204(1) is represented by a long dashed line, two-bounce radiance 204(2) is represented by a short dashed line ... and k-bounce radiance 204(k) is represented by a line with dashes and dots.

In an example embodiment, incident radiance 204 is separated into respective components that are respectively associated with a different respective number of scene interreflections. Thus, total incident radiance 204 is effectively determined responsive to incident radiance with no interreflections 204(0), incident radiance with one interreflection 204(1), incident radiance with two interreflections 204(2), and so forth.

Figure 8:
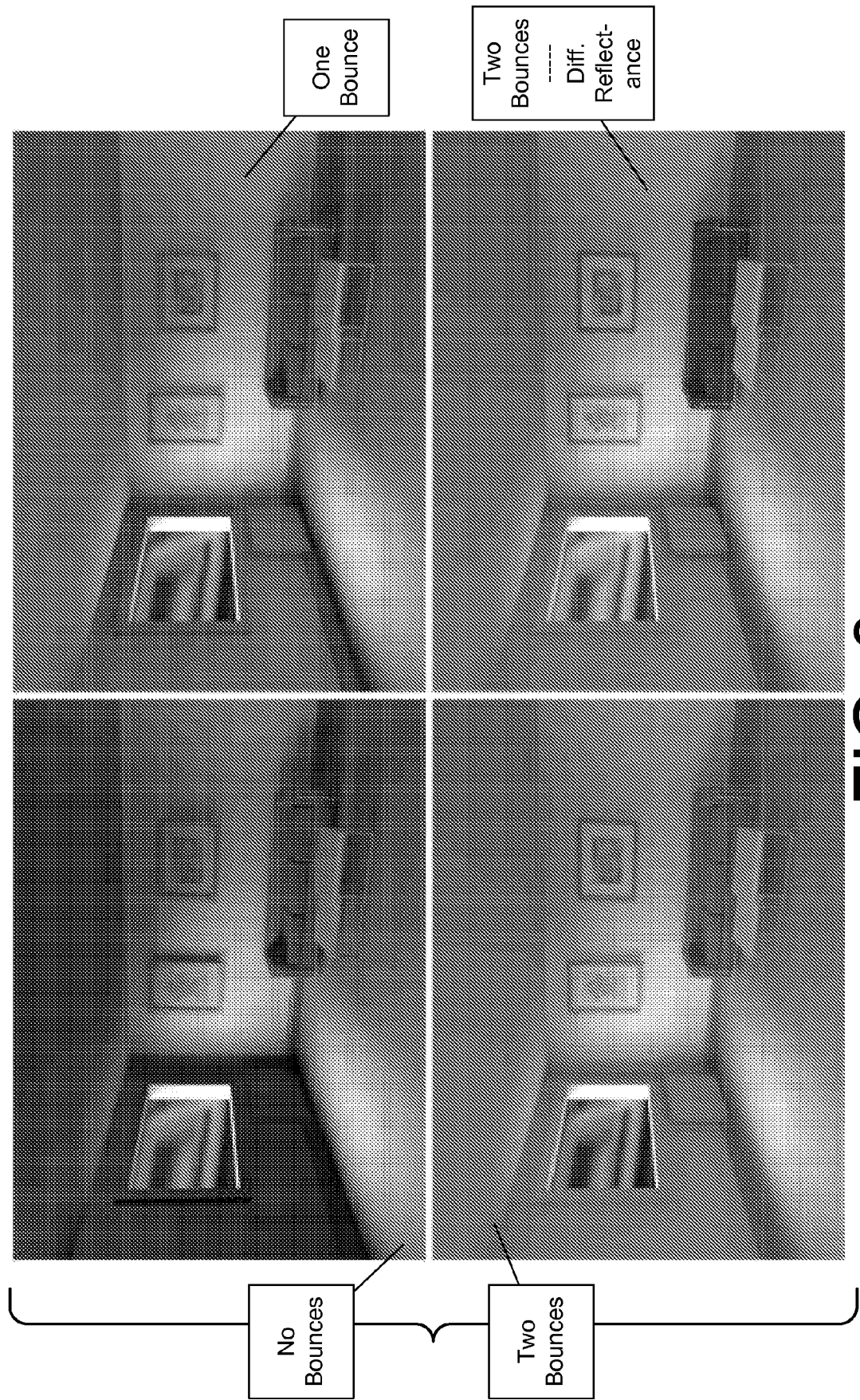
FIG. 8 illustrates four graphical scenes produced with transferred incident radiance that is separated into different numbers of transferred incident radiance components and/or that has different reflectance values.

FIG. 8 illustrates four graphical scenes produced with transferred incident radiance that is separated into different numbers of transferred incident radiance components and/or that has different reflectance values. Renderings of global illumination for an indoor graphical scene are shown. The upper left graphical scene was produced with direct lighting and no interreflected light. The upper right graphical scene was produced with direct lighting and once interreflected light. The lower left graphical scene was produced with direct lighting as well as once and twice interreflected light. The changes to shadows and brightness are apparent. The lower right graphical scene was also produced with once and twice interreflected light in addition to direct lighting; however, different reflectance values were assigned to the sofa and floor.

3.2: Reflectance (E.g., BRDF)

For relatively efficient evaluation of reflectances at a surface spot, we describe an example embodiment including a tensor BRDF representation that can be factorized into adjustable lighting, viewing, and reflectance terms. We model BRDFs from a set of reflectance data $f(h, \omega_o, \omega_i)$ that may be generated from a given reflectance model, taken from measurements of real materials, some combination thereof, and so forth. In the reflectance function model, h indexes the BRDFs, $\omega_o$ is the view direction, and $\omega_i$ is the incident direction.

In representing BRDFs at a surface spot, we discretize f (h, $\omega_o$, $\omega_i$) as a 3rd-order tensor $$F \in \Re^{N_h \times N_{\omega_o} \times N_{\omega_i}}$$

in which $N_h$, $N_{\omega_o}$ and $N_{\omega_i}$ are the sampling resolutions of h, $\omega_o$ and $\omega_i$ respectively. By segmenting the tensor into factors that depend on h, $\omega_o$ and $\omega_i$ using a tensor factorization algorithm, F can be approximated as shown in equation (3):

$$F \approx D \times_h U^h \times_{\omega_o} U^{\omega_o} \times_{\omega_i} U^{\omega_i}, \quad (3)$$

from which a given BRDF value can then be calculated from equation (4):

$$f(h, \omega_o, \omega_i) \approx \sum_{i=1}^{n_h}\sum_{j=1}^{n_{\omega_o}}\sum_{k=1}^{n_{\omega_i}} D(i,j,k) U^h(h,i) U^{\omega_o}(\omega_o, j) U^{\omega_i}(\omega_i, k). \quad (4)$$

Here, $$D \in \Re^{N_h \times N_{\omega_o} \times N_{\omega_i}}$$

is the BRDF tensor core, where $n_h \leq N_h$, $n_{\omega_o} \leq N_{\omega_o}$, $n_{\omega_i} \leq N_{\omega_i}$ are the resolutions of the reflectance parameters, view direction, and incident direction, respectively, after factorization. The reflectance factor $U^h$, the view factor $U^{\omega_o}$ and the light factor $U^{\omega_i}$ are $N_h \times n_h$, $N_{\omega_o} \times n_{\omega_o}$, $N_{\omega_i} \times n_{\omega_i}$ matrices respectively. With this tensor approximation, we can significantly compress the BRDF set F, and reflectance values can be easily computed for arbitrary incident light distributions, reflectance functions, and viewpoints.

Figure 9:
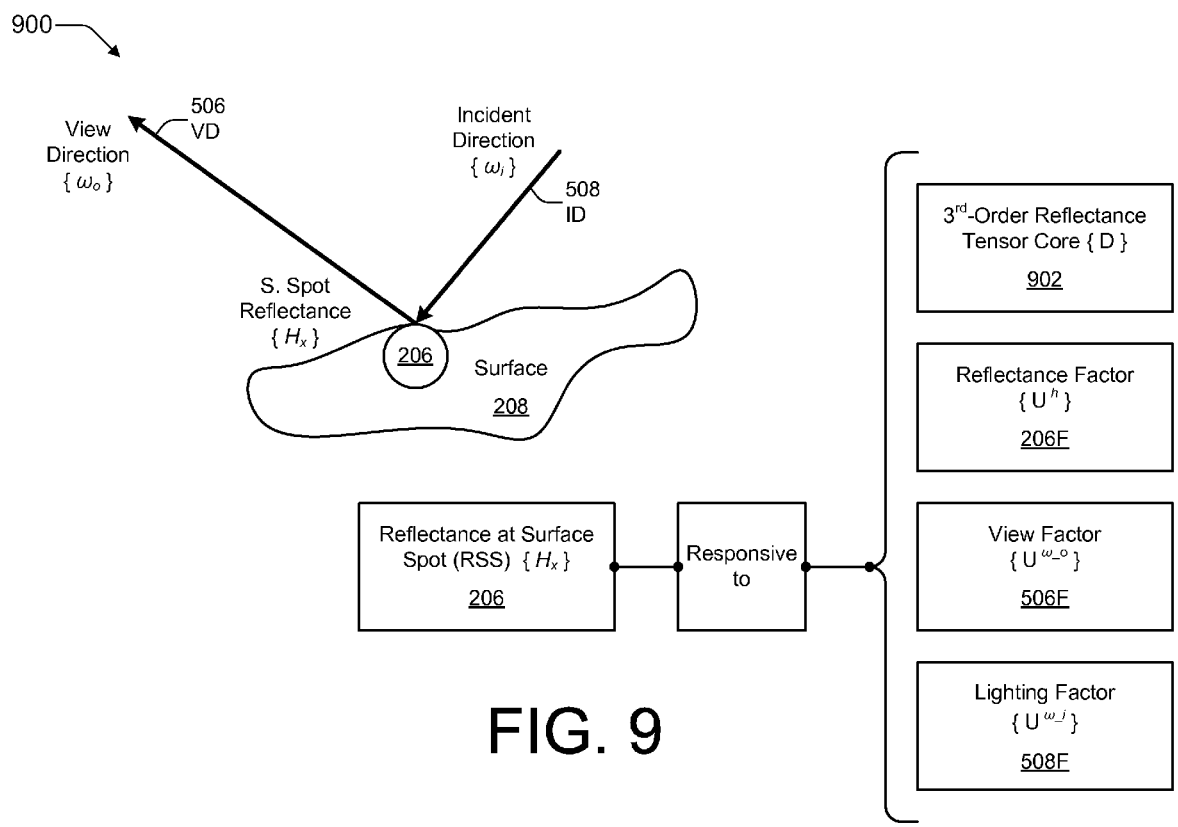
FIG. 9 is a block diagram of an example surface spot reflectance segmentation into reflectance, view, and lighting factors for a tensor representation of the surface spot reflectance.

FIG. 9 is a block diagram 900 of an example surface spot reflectance segmentation into reflectance, view, and lighting factors for a tensor representation of surface spot reflectance 206. As illustrated, a surface 208 includes a surface spot reflectance 206. An incident direction 508 $\{\omega_i\}$, a view direction 506 $\{\omega_o\}$, and a surface spot reflectance $\{H_x\}$ are shown.

In an example embodiment, reflectance at surface spot 206 is determined responsive to a reflectance factor 206F, a view factor 506F, and a lighting factor 508F, as well as a tensor core 902. Tensor core 902 may be a third-order reflectance tensor core $\{D\}$. Reflectance factor 206F $\{U^h\}$ may be a matrix based on the sampling resolution of the reflectance index h. View factor 506F $\{U^{\omega_o}\}$ may be a matrix based on the sampling resolution of the view direction $\omega_o$. Lighting factor 508F $\{U^{\omega_i}\}$ may be a matrix based on the sampling resolution of the incident direction $\omega_i$.

3.3: Relighting Computation

For an example embodiment, with PTTs for incident radiance and the tensor decomposition for reflectance functions, the relighting equation (1) can be relatively rapidly evaluated at run time for arbitrary distant source radiance, scene BRDFs, and viewing directions.

By way of example only, let the source radiance L be represented by a Haar wavelet basis $\{L_l | 1 \leq l \leq N_L\}$ such that $L = \Sigma C_l^L L_l$. The relighting equation (1) is rewritten using the reflectance function tensor approximation of equation (4) to obtain the exit radiance from equation (5) as follows:

$$B_x(L, H, \omega_o) \approx \sum_{i=1}^{n_h}\sum_{j=1}^{n_{\omega_o}}\sum_{k=1}^{n_{\omega_i}} D(i,j,k) U^h(H_x, i) U^{\omega_o}(\omega_o, j) \sum_{l=1}^{N_L} C_l^L U_x^L(l, k, H). \quad (5)$$

The incidence component $U_x^I$ represents the transferred incident radiance at x after modulation by the BRDF lighting factor $U^{\omega_i}$. We compute the incidence component $U_x^I$ at run time as separate terms in correspondence with PTTs as shown by equation (6) below:

$$U_x^I = U_x^{I0} + U_x^{I1} + U_x^{I2}, \quad (6)$$

where $U_x^{Ik}$ denotes the incidence component for lighting that has undergone k interreflections before arriving at x. Each of these terms may be evaluated as described in the following sections.

Direct Lighting

For direct lighting in an example embodiment, transferred incident radiance is determined by the visibility of light sources. Denoting visibility from point x towards direction $\omega$ as $v_x(\omega)$ we can express the incidence component as follows in equation (7):

$$U_x^{I0}(l, k) = \int_\Omega L_l(\omega) U^{\omega_i}(\omega, k)(\omega \cdot n_x) v_x(\omega) d\omega, \quad (7)$$

where $L_l$ represents the l-th wavelet basis function of source illumination. Because direct lighting does not interact with the scene before arriving at x, it is independent of scene BRDFs.

One-Bounce Interreflection

In evaluating the incidence component for one-bounce interreflection at run time in an example embodiment, inner products between the incident transfer tensor $T^1$ and the BRDF coefficients of each region are computed. They are added together to obtain the transferred incident radiance, with which an inner product is computed with a matrix $C^{\omega_i}$ based on the BRDF light factor as shown in equation (8A):

$$U_x^{I1}(l, k, H) = \sum_{s=1}^{S} C^{\omega_i}(s, k) \sum_{r=1}^{n_R}\sum_{p=1}^{n_P} H(r, p) T_x^1(l, r, p, s) \quad (8A)$$

where $$C^{\omega_i}(s, k) = \int_\Omega L_s^{SH}(\omega) U^{\omega_i}(\omega, k)(\omega \cdot n_x) d\omega. \quad (8B)$$

Here, H(r, p) denotes the adjustable BRDF coefficient of region r and basis function p. Like $T^1$, matrix $C^{\omega_i}$ is a precomputed quantity in terms of spherical harmonics.

Two-Bounce Interreflection

In an example embodiment for incident radiance after two bounces, we instead process radiance transferred through ordered pairs $(r_1, r_2)$ of scene regions. Because transferred incident radiance after two bounces can be considered to arrive at surface spot x in a uniform distribution, the incidence component is given by equation (9A):

$$U_x^{l2}(l, k, H) = \qquad (9A)$$

$$C^{\omega_i}(k) \sum_{r_1=1}^{n_R} \sum_{p_1=1}^{n_P} \sum_{r_2=1}^{n_R} \sum_{p_2=1}^{n_P} H(r_1, p_1)H(r_2, p_2)T_x^2(l, r_1, p_1, r_2, p_2)$$

where $$C^{\omega_i}(k) \int_\Omega U^{\omega_i}(\omega, k)(\omega \cdot n_x) d\omega. \qquad (9B)$$

4: Example Implementations with Mirror Part Extraction

The high-frequency specular components of many BRDFs involve a large number of basis terms for accurate reconstruction, but use of a large basis makes interactive performance all the more difficult. In an example embodiment, to handle specular effects, we extract the high-frequency mirror part of specular reflection from the BRDF tensor. The high-frequency mirror part can be relatively rapidly processed using precomputed visibility.

This specular component bifurcation divides BRDFs into a mirror part $f_m$ and a remainder part $f_r$ as shown in equation (10A) below:

$$f(h, \omega_o, \omega_i) = f_m(h, \omega_o, \omega_i) + f_r(h, \omega_o, \omega_i), \qquad (10A)$$

where $$f_r(h, \omega_o, \omega_i) = \begin{cases} \bar{f}(h, \omega_o, \omega_i), & \text{if } \omega_o = \omega_i \text{ and } \bar{f} < f; \\ f(h, \omega_o, \omega_i), & \text{otherwise.} \end{cases} \qquad (10B)$$

$\bar{f}(h,\omega_o,\omega_i)$ represents the maximum BRDF value among sampled $\omega_o$, $\omega_i$ around but not including the mirror direction. Generally, the mirror part models a portion of $f(h, \omega_o, \omega_i)$ such that $f_r$ does not exhibit a spike at $\omega_o=\omega_i$.

In an example implementation, the BRDF tensor is computed using $f_r$, while the effects of $f_m$ are separately evaluated. For direct lighting, the visibility map of the vertex is queried for the mirror direction of the view angle. If it is not occluded, the corresponding light from the environment map is multiplied by $f_m$ to obtain the mirror part. Otherwise, the mirror part is computed with respect to transferred incident radiance from one-bounce interreflection. The uniform incident radiance from two-bounce interreflection may be disregarded. Mirror part extraction can produce significant reductions in approximation error for each of the sampled values of $n_h$, $n_{\omega_i}$, $n_{\omega_o}$.

Figure 10:
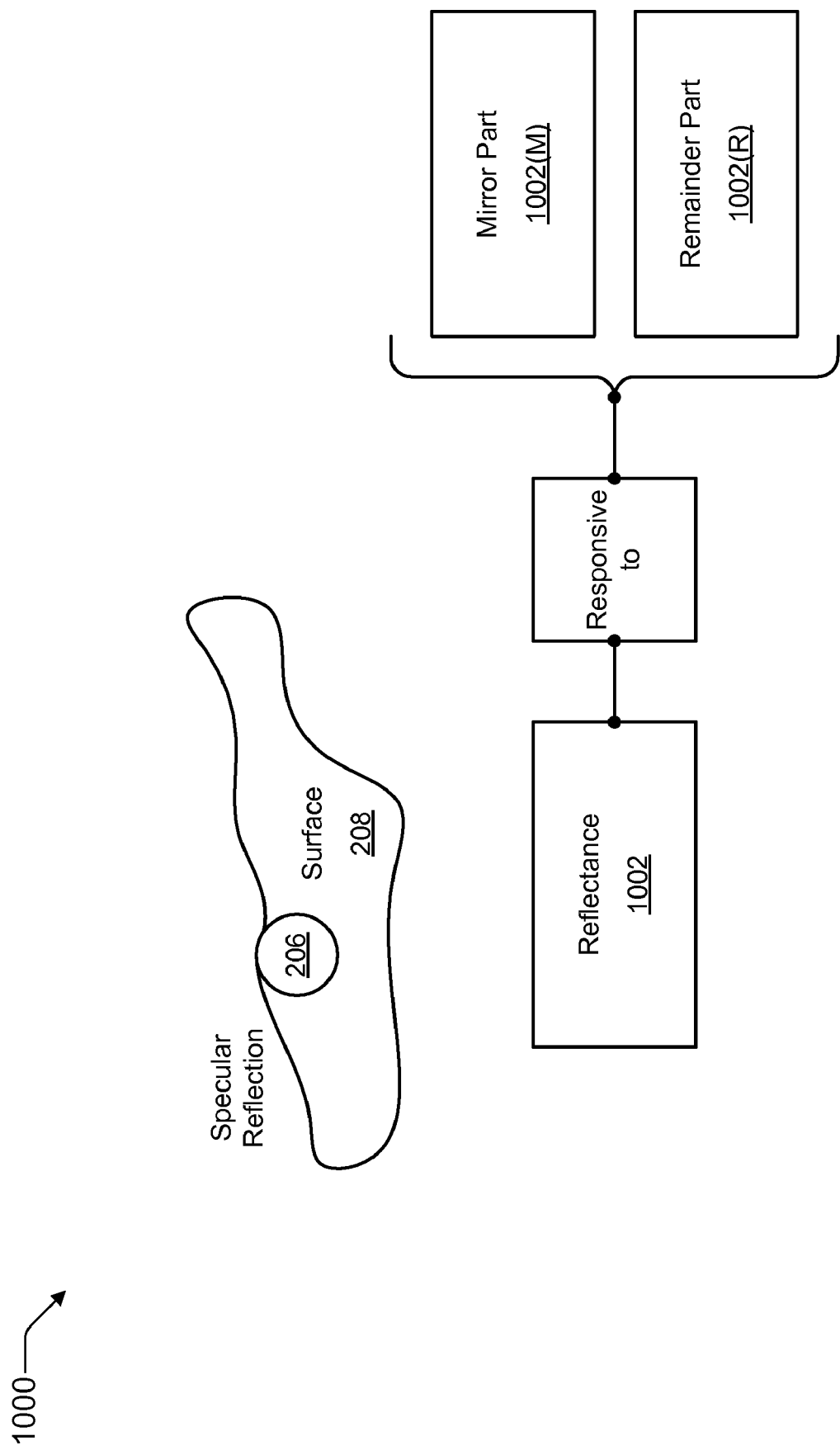
FIG. 10 is a block diagram of an example reflectance bifurcation into a mirror part and a remainder part.

FIG. 10 is a block diagram 1000 of an example reflectance 1002 bifurcation into a mirror part 1002(M) and a remainder part 1002(R). As illustrated, a surface 208 includes a surface spot reflectance 206. In an example embodiment, reflectance 1002 is formulated to be responsive to mirror part 1002(M) and remainder part 1002(R). An example implementation for their bifurcation and subsequent combined application to a graphical scene is described quantitatively above.

Figure 11:
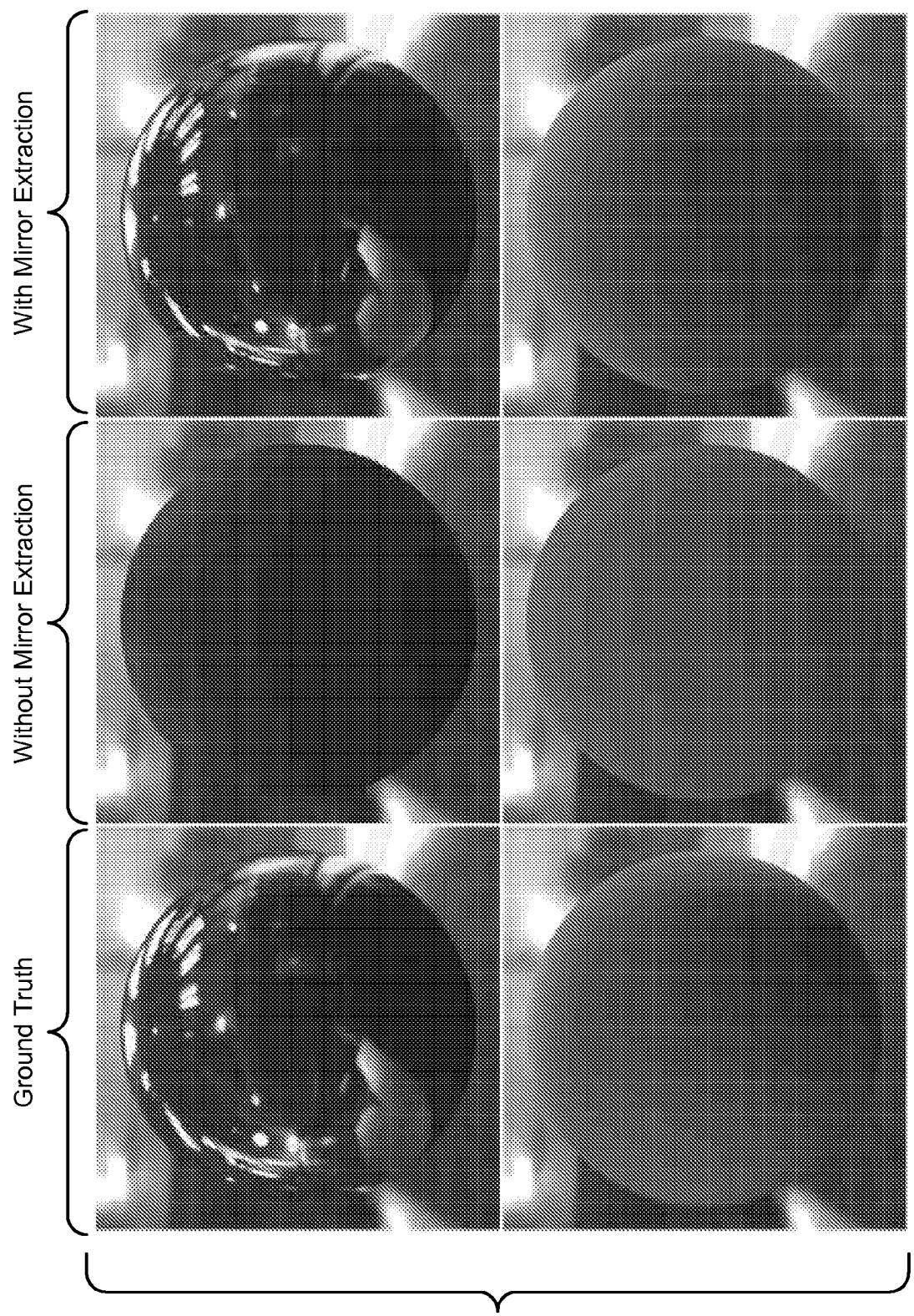
FIG. 11 illustrates six graphical scenes that show the effects of reflectance bifurcation into mirror and remainder parts.

FIG. 11 illustrates six graphical scenes that show the effects of reflectance bifurcation into mirror and remainder parts. Mirror extraction is shown for a shiny material (in the top row) and a diffuse material (in the bottom row). From left to right: the first column has ground truth images, the middle column shows them without mirror extraction, and the last column illustrates them with mirror extraction. As is apparent from these example rendering comparisons, even though the diffuse material contains little if any mirror reflection, it is relatively poorly reconstructed without extracting the mirror parts from the BRDF tensor, which allows for better overall representation accuracy of the BRDFs after tensor approximation.

Figure 12:
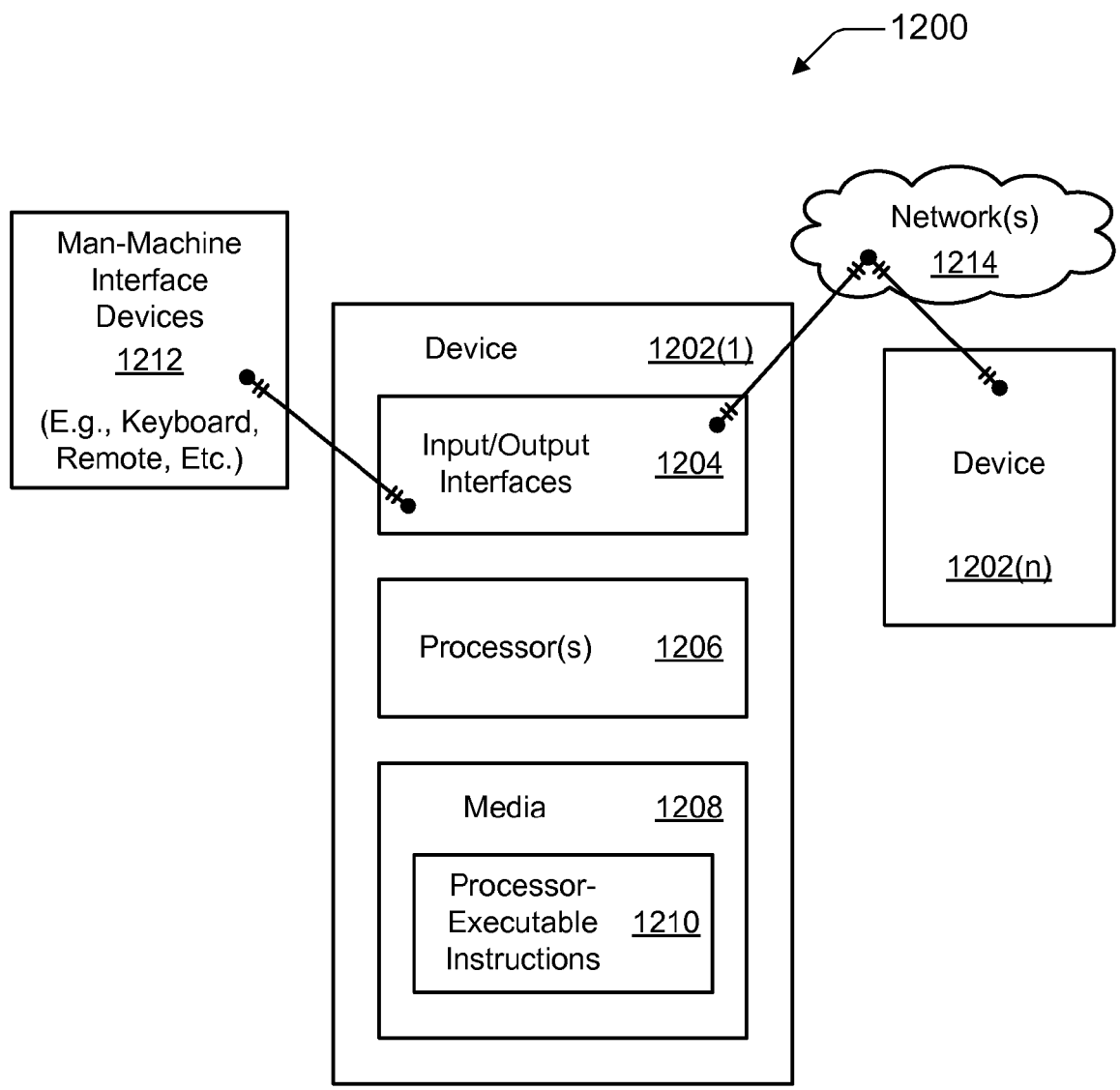
FIG. 12 is a block diagram of an example device that may be used to implement interactive relighting with dynamic reflectance.

Example Device Implementations for Interactive Relighting With Dynamic Reflectance FIG. 12 is a block diagram 1200 of an example device 1202 that may be used to implement interactive relighting with dynamic reflectance. Processing devices 102 (of FIG. 1) may be realized as devices 1202. As illustrated, two devices 1202(1) and 1202(n) are capable of engaging in communications via network(s) 1214. Although two devices 1202 are specifically shown, one or more than two devices 1202 may be employed, depending on implementation. Network(s) 1214 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, a wireless network, a mesh network, some combination thereof, and so forth. Alternatively, two devices 1202 may be directly connected.

Generally, a device 1202 may represent any computer or processing-capable device, such as a server device; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. As illustrated, device 1202 includes one or more input/output (I/O) interfaces 1204, at least one processor 1206, and one or more media 1208. Media 1208 include processor-executable instructions 1210.

In an example embodiment of device 1202, I/O interfaces 1204 may include (i) a network interface for communicating across network 1214, (ii) a display device interface for displaying information on a display screen, (iii) one or more man-machine interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 1212 (e.g., a keyboard, a remote, a mouse or other graphical pointing device, etc.).

Generally, processor 1206 is capable of executing, performing, and/or otherwise effectuating processor-executable instructions, such as processor-executable instructions 1210. Media 1208 is comprised of one or more processor-accessible media. In other words, media 1208 may include processor-executable instructions 1210 that are executable by processor 1206 to effectuate the performance of functions by device 1202. Processor-executable instructions may be embodied as software, firmware, hardware, fixed logic circuitry, some combination thereof, and so forth.

Thus, realizations for interactive relighting with dynamic reflectance may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 1206 may be implemented using any applicable processing-capable technology, and one may be realized as a general purpose processor (e.g., a central processing unit (CPU), a microprocessor, a controller, etc.), a graphics processing unit (GPU), a derivative thereof, and so forth. Media 1208 may be any available media that is included as part of and/or accessible by device 1202. It includes volatile and non-volatile media, removable and non-removable media, storage and transmission media (e.g., wireless or wired communication channels), hard-coded logic media, combinations thereof, and so forth. Media 1208 is tangible media when it is embodied as a manufacture and/or as a composition of matter. For example, media 1208 may include an array of disks or flash memory for longer-term mass storage of processor-executable instructions 1210, random access memory (RAM) for shorter-term storing of instructions that are currently being executed and/or otherwise processed, link(s) on network 1214 for transmitting communications, and so forth.

As specifically illustrated, media 1208 comprises at least processor-executable instructions 1210. Generally, processor-executable instructions 1210, when executed by processor 1206, enable device 1202 to perform the various functions described herein. Such functions include, but are not limited to: (i) those actions that are illustrated in flow diagram 300 (of FIG. 3); (ii) those actions implementable by the components of graphics component 104 (of FIG. 4); (iii) those actions undertaken for graphical processing (e.g., of FIGS. 2, 7, 9, and 10); (iv) the graphical renderings and lightings of other FIGS.; other algorithms described herein; combinations thereof; and so forth.

The devices, acts, aspects, features, functions, procedures, modules, data structures, techniques, components, parts, etc. of FIGS. 1-12 are illustrated in diagrams that are divided into multiple blocks and other elements. However, the order, interconnections, interrelationships, layout, etc. in which FIGS. 1-12 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for interactive relighting with dynamic reflectance.

Although systems, media, devices, methods, procedures, apparatuses, mechanisms, schemes, approaches, processes, arrangements, and other example embodiments have been described in language specific to structural, logical, algorithmic, and functional features and/or diagrams, it is to be understood that the invention defined in the appended claims is not necesarily limited to the specific features or acts described above. Rather, the specific features and acts described above are disclosed as example forms of implementing the claims.

What is claimed is:

1. A computer-implemented method performed by a processor unit comprising:
   lighting a graphical scene based on a source radiance, one or more scene reflectances, and a view direction, the graphical scene including a surface spot having a reflectance;
   adjusting at least one reflectance of the graphical scene;
   relighting the graphical scene based on the at least one adjusted reflectance of the graphical scene using an incident radiance at the surface spot that is separated into respective incident radiance components corresponding to different respective numbers of interreflections in the graphical scene, the act of relighting comprising using precomputed transfer tensors (PTTs) to relate the incident radiance components along a path to a first component, the source radiance and a second component, where the first component and the second component represent a global illumination along different light paths that arrive at the surface spot; and
   interactively rendering the graphical scene with relighting conditions, the view direction, and the at least one adjusted reflectance.

2. The computer-implemented method as recited in claim 1, wherein the respective incident radiance components comprise three incident radiance components corresponding to direct incident radiance, one-interreflection incident radiance, and two-interreflection incident radiance.

3. A computer-implemented method performed by a processor unit comprising:
   lighting a graphical scene based on a source radiance, one or more scene reflectances, and a view direction, the graphical scene including a surface spot having a reflectance;
   adjusting at least one reflectance of the graphical scene;
   relighting the graphical scene based on the at least one adjusted reflectance of the graphical scene using a tensor representation for the reflectance of the surface spot that is segmented into three adjustable factors comprising a lighting factor, a viewing factor, and a reflectance factor; and
   interactively rendering the graphical scene with relighting conditions, the view direction, and the at least one adjusted reflectance.

4. The computer-implemented method as recited in claim 3, wherein the act of relighting comprises:
   approximating the tensor representation of the reflectance of the surface spot using a third-order tensor and a tensor factorization algorithm.

5. The computer-implemented method as recited in claim 3, wherein the act of relighting comprises:
   extracting a mirror part from at least one reflectance function;
   evaluating visual effects for the graphical scene that are derived from the mirror part; and
   computing the tensor representation independent of the extracted mirror part.

6. The computer-implemented method as recited in claim 3, wherein the lighting factor reflects an incident direction for the source radiance with respect to the surface spot, the viewing factor reflects a view direction with respect to the surface spot, and the reflectance factor reflects an index into a reflectance function for the reflectance of the surface spot.

7. The computer-implemented method as recited in claim 3, wherein the lighting factor comprises a lighting matrix based on a sampling resolution of an incident direction, the viewing factor comprises a viewing matrix based on a sampling resolution of a view direction, and the reflectance factor comprises a reflectance matrix based on a sampling resolution of a reflectance index.

8. A computer-implemented method comprising:
   lighting a graphical scene based on a source radiance, one or more scene reflectances, and a view direction, the graphical scene including a surface spot having a reflectance;
   adjusting at least one reflectance of the graphical scene;
   relighting the graphical scene based on the at least one adjusted reflectance of the graphical scene (i) using an incident radiance at the surface spot that is separated into respective incident radiance components corresponding to different respective numbers of interreflections in the graphical scene and (ii) using a tensor representation for the reflectance of the surface spot that is segmented into three adjustable factors comprising a lighting factor, a viewing factor, and a reflectance factor;

wherein the incident radiance components comprise a one-bounce interreflection incident radiance component, and the act of relighting comprises:

determining the one-bounce interreflection incident radiance component by performing acts comprising:

computing inner products between a one-bounce precomputed transfer tensor and reflectance function coefficients of each region of the graphical scene;

adding the computed inner products together to obtain one-bounce incident radiance; and calculating an inner product between the one-bounce incident radiance and a matrix based on the lighting factor; and displaying the relighted graphical scene having the at least one adjusted reflectance.

9. The computer-implemented method as recited in claim 8, wherein the act of displaying the relighted graphical scene comprises displaying the relighted graphical scene on a display screen; and wherein the method further comprises:

prior to the act of displaying the relighted graphical scene, displaying the lighted graphical scene on the display screen.

10. The computer-implemented method as recited in claim 8, wherein the act of relighting is performed in real-time.

11. The computer-implemented method as recited in claim 8, wherein the one or more scene reflectances comprise bidirectional reflectance distribution functions (BRDFs) that are generated from at least one of measurements of real materials or a given reflectance model.

12. The computer-implemented method as recited in claim 8, wherein the act of adjusting comprises adjusting any of the one or more scene reflectances, including the reflectance of the surface spot.

13. The computer-implemented method as recited in claim 8, wherein the incident radiance components comprise a direct incident radiance component; and wherein the act of relighting comprises:

determining the direct incident radiance component responsive to one or more portions of the source radiance that are visible at the surface spot.

* * * * *

UNITED STATES PATENT AND TRADEMARK OFFICE
CERTIFICATE OF CORRECTION

PATENT NO. : 7,884,820 B2
APPLICATION NO. : 11/764062
DATED : February 8, 2011
INVENTOR(S) : Kun Zhou et al.

Page 1 of 1

It is certified that error appears in the above-identified patent and that said Letters Patent is hereby corrected as shown below:

In Face page, in field (73), under "Assignee" column 1, line 1, delete "Micorsoft" and insert -- Microsoft --, therefor.

In column 15, line 19, in Claim 8, after "obtain" insert -- a --.

Signed and Sealed this
Nineteenth Day of July, 2011

David J. Kappos
*Director of the United States Patent and Trademark Office*